(12) United States Patent
Hwang

(10) Patent No.: US 9,348,502 B2
(45) Date of Patent: May 24, 2016

(54) DIMMING METHOD AND DISPLAY APPARATUS USING THE SAME

(71) Applicant: Korea Advanced Institute of Science and Technology, Daejeon (KR)

(72) Inventor: Sungjae Hwang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 241 days.

(21) Appl. No.: 13/669,699

(22) Filed: Nov. 6, 2012

(65) Prior Publication Data

US 2013/0293589 A1  Nov. 7, 2013

(30) Foreign Application Priority Data

May 3, 2012  (KR) ......................... 10-2012-0046848

(51) Int. Cl.
| | | |
|---|---|---|
| G06T 15/50 | (2011.01) | |
| G06F 3/0488 | (2013.01) | |
| G06F 3/0484 | (2013.01) | |
| G06F 3/0485 | (2013.01) | |
| G06F 3/0486 | (2013.01) | |
| G09G 3/34 | (2006.01) | |

(52) U.S. Cl.
CPC ............ *G06F 3/0488* (2013.01); *G06F 3/0485* (2013.01); *G06F 3/0486* (2013.01); *G06F 3/04845* (2013.01); *G06T 15/50* (2013.01); *G09G 3/3406* (2013.01); *G06F 2203/04808* (2013.01); *G09G 2320/0626* (2013.01); *G09G 2320/0686* (2013.01); *G09G 2330/021* (2013.01)

(58) Field of Classification Search
USPC .............. 345/694, 419, 690; 715/863; 725/52
See application file for complete search history.

(56) References Cited

U.S. PATENT DOCUMENTS

| | | | |
|---|---|---|---|
| 2005/0235319 A1* | 10/2005 | Carpenter et al. .............. | 725/52 |
| 2011/0164034 A1* | 7/2011 | Bennett et al. ................. | 345/419 |
| 2011/0181628 A1* | 7/2011 | You et al. ....................... | 345/690 |
| 2012/0113307 A1* | 5/2012 | Watanabe et al. ......... | 348/333.01 |
| 2012/0154466 A1* | 6/2012 | Kitada ........................... | 345/694 |
| 2012/0284673 A1* | 11/2012 | Lamb et al. ................... | 715/863 |

* cited by examiner

*Primary Examiner* — Phi Hoang
(74) *Attorney, Agent, or Firm* — Paratus Law Group, PLLC

(57) ABSTRACT

There is provided a dimming method of a display apparatus, including calculating a velocity of a content object that is displayed on the display apparatus, and adjusting the light output of a content object area at which the content object is displayed on the display apparatus or of an entire display area including the content object area, according to the velocity of the content object.

29 Claims, 15 Drawing Sheets (a)

(b)

FIG. 3
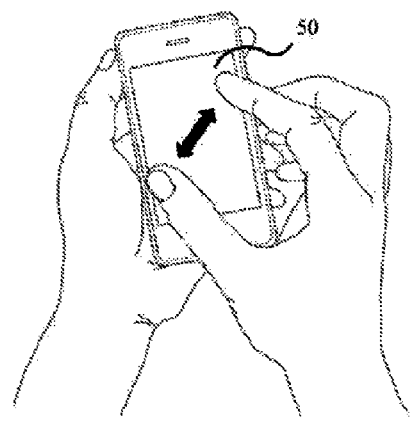
(a)
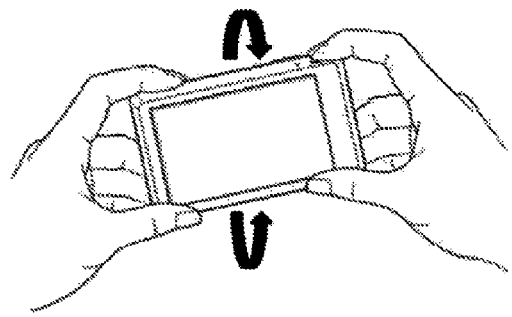
(b)
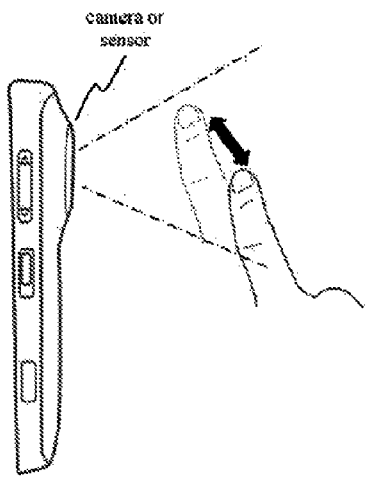
(c)
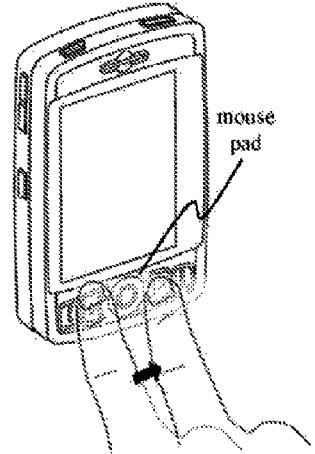
(d)

(a)　　　　　　　　(b)

FIG. 5
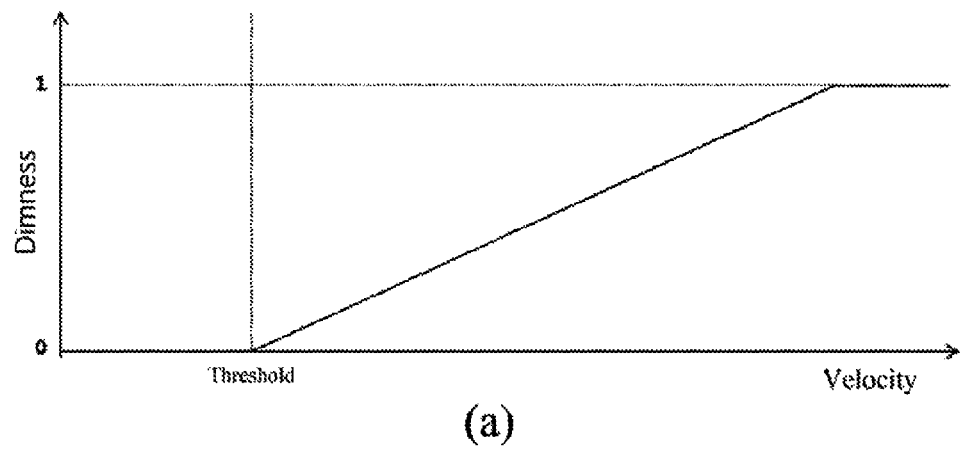
(a)
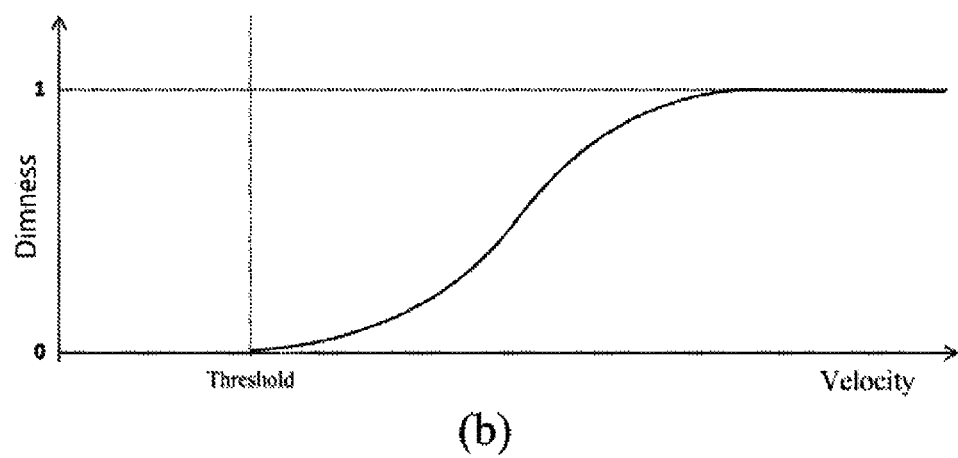
(b)

DIMMING METHOD AND DISPLAY APPARATUS USING THE SAME

CROSS REFERENCE TO PRIOR APPLICATIONS

The present application claims priority under 35 U.S.C. §119 to Korean Patent Application No. 10-2012-0046848 (filed on May 3, 2012), which is hereby incorporated by reference in its entirety.

TECHNICAL FIELD

The described technology relates generally to a dimming method used in a display apparatus, and a display apparatus using the dimming method.

BACKGROUND

In general, a liquid crystal display (LCD) includes a display panel in which a plurality of pixels are arranged in a matrix form, and a backlight unit which is attached on the back side of the display panel and has light sources for radiating light to the pixels. The LCD displays an image according to driving voltages provided to the pixels and intensities of light radiated from the light sources.

Image quality of the LCD depends on a contrast property. A method of controlling a data voltage that is applied to a liquid crystal layer to modulate light transmission has a limitation in improving the contrast property. In order to improve the contrast property, a backlight dimming method of adjusting the brightness of a backlight according to an image has been proposed. The backlight dimming method includes a global dimming method of adjusting the brightness of an entire display area, and a local dimming method of partially adjusting the brightness of display areas. According to the local dimming method, an LCD is controlled such that blocks have different dimming levels. Also, an LCD based on the global dimming method is controlled under the same dimming level since the LCD is configured as a single block. The global dimming method can improve dynamic contrast measured between a frame and the previous frame. The local dimming method can improve static contrast by locally controlling the brightness of display areas in a frame period. The global dimming method has difficulties in improving the static contrast.

Meanwhile, an organic light emitting diode (OLED) display, which has attracted attention as a next-generation flat panel display, requires no backlight unit since a fluorescent organic compound itself radiates light, unlike liquid crystal. In the OLED display, light-emitting devices configuring pixels of a display panel control the intensity of light.

SUMMARY

In an aspect, there is provided a display apparatus including a backlight unit (BLU), the display apparatus includes a display panel on which a content image is displayed, a BLU including a plurality of light sources, and configured to radiate light to the back side of the display panel and a dimming control circuit configured to calculate a velocity of the content object displayed on the display panel, and to adjust the output value of light that is radiated to a content object area at which the content object is displayed on the display panel or to an entire display area including the content object area, according to the velocity of the content object.

The display apparatus may further includes an interface unit configured to receive a signal for changing the location or size of the content object.

The dimming control circuit adjusts the output of the light that is radiated to the content object area or the entire display area on the display panel such that the output of the light has a lower value at a higher velocity of the content object.

The dimming control circuit may adjust the output of the light if the velocity of the content object exceeds a threshold value.

In another aspect, there is provided a display apparatus including a plurality of display light-emitting devices, the display apparatus includes a display panel which includes the plurality of display light-emitting devices, and on which a content image is displayed and a dimming control circuit configured to calculate a velocity of the content object displayed on the display panel, to adjust the light outputs of display light-emitting devices in a content object area at which the content object is displayed on the display panel or in an entire display area including the content object area, according to the velocity of the content object.

The interface unit may be a touch panel, and the signal for changing the location or size of the content object is a touch input, a multi-touch input, a drag input, a flicking gesture input, a pinch gesture input, or a spread gesture input, which is input to the touch panel.

The interface unit may be at least one of a voice recognition device including a microphone, an image recognition device including a camera, a tilt recognition device including a tilt sensor, a keypad, and a mouse pad.

In another aspect, there is provided a dimming method of a display apparatus, the method includes calculating a velocity of a content object that is displayed on the display apparatus and adjusting dimming of a content object area at which the content object is displayed on the display apparatus, or of an entire display area including the content object area, according to the velocity of the content object.

The velocity of the content object is changed by receiving a signal for changing the location or size of the content object from an interface unit connected to the display apparatus.

The signal is at least one of a touch input, a multi-touch input, a drag input, a flicking gesture input, a pinch gesture input, and a spread gesture input, which is input to the touch panel.

The adjusting of the dimming includes adjusting the light output value of the content object area or the entire display area such that a lower light output value is output at a higher velocity of the content object.

The adjusting of the dimming may further include, when the velocity of the content object becomes zero after the light output value of the content object area or the entire display area is adjusted, returning the adjusted light output value to an original light output value before the light output value was adjusted, after a reference time period has elapsed from when the velocity of the content object becomes zero.

The adjusting of the dimming may include adjusting the light output value of the content object area or the entire display area when the velocity of the content object exceeds a threshold value.

The adjusting of the dimming may further include, if the velocity of the content object is maintained lower than the threshold value for a reference time period after the light output value of the content object area or the entire display area is adjusted, returning the adjusted light output value to an original light output value before the light output value was adjusted.

In another aspect, there is provided a display apparatus for radiating light using a light source, the display apparatus includes a light source unit including a plurality of light sources, and configured to radiate light to an external screen to display a content image and a dimming control circuit configured to calculate a velocity of the content object displayed on the external screen, and to adjust the output value of light that is radiated to a content object area at which the content object is displayed on the external screen or to an entire display area including the content object area, according to the velocity of the content object.

In another aspect, there is provided a method of a display apparatus, the method includes at an interface unit, sensing an input signal for changing the velocity of content displayed on the display apparatus, at the display apparatus, calculating the velocity of the content and at the display apparatus, adjusting dimming of a content display area at which the content is displayed on the display apparatus, or an entire display area including the content display area, according to the velocity of the content.

The input signal is a signal for changing the location or size of the content

The input signal is at least one of a touch input, a multi-touch input, a drag input, a flicking gesture input, a pinch gesture input, and a spread gesture input, which is input to the touch panel.

The interface unit is at least one of a touch panel connected to the display apparatus and transferring an input signal, a camera connected to the display apparatus and transferring an input signal, an operation sensor connected to the display apparatus and transferring an input signal, a microphone connected to the display apparatus and transferring an input signal, a tilt sensor connected to the display apparatus and transferring an input signal, a gyro sensor connected to the display apparatus and transferring an input signal, an acceleration sensor connected to the display apparatus and transferring an input signal, a magnetic sensor connected to the display apparatus and transferring an input signal, a keypad connected to the display apparatus and transferring an input signal, and a mouse pad connected to the display apparatus and transferring an input signal.

The adjusting of the dimming comprises adjusting the light output value of the content display area or the entire display area such that a lower light output value is output at a higher velocity of the content.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The above and other features and advantages of the present disclosure will become more apparent to those of ordinary skill in the art by describing in detail example embodiments thereof with reference to the attached drawings in which:

FIG. 3 shows examples of interface methods for changing the locations or sizes of content objects that are displayed on a display apparatus;

FIG. 5 shows examples of graphs showing the degree of dimness with respect to the velocity of a content object when a dimming method is performed by a display apparatus;

Figure 1:
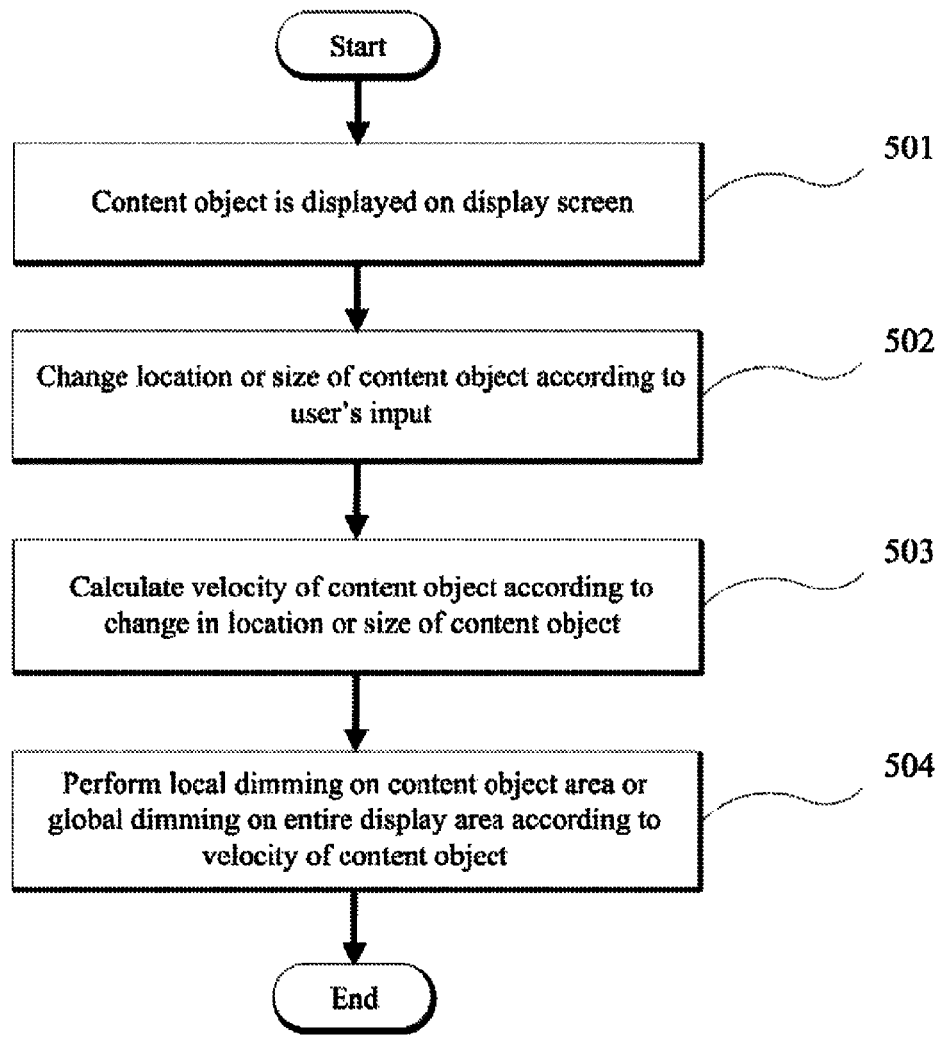
FIG. 1 is a flowchart illustrating an example of a dimming method that is performed by a display apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

It will also be understood that when an element or layer is referred to as being "on," another element or layer, the element or layer may be directly on the other element or layer or intervening elements or layers may be present. As used herein, the term "and/or" may include any and all combinations of one or more of the associated listed items.

First, a dimming method which is performed by a display apparatus will be briefly described below.

A liquid crystal display (LCD) can display images when light is radiated to the back side of the LCD since the LCD itself cannot emit light. A light source for radiating light to the back side of the LCD is called a backlight unit (BLU). Since the BLU occupies about 70 to 80% of consumption power of the corresponding product, technologies for power saving through efficient control of the BLU have been introduced.

The technologies for power saving are classified into a global dimming method and a local dimming method. The global dimming method is mainly used in a display apparatus such as a display with a cold cathode fluorescent lamp (CCFL)-based backlight, which cannot partially control the brightness of a backlight. That is, the global dimming method is used to adjust the brightness of the entire display area of a display apparatus. Meanwhile, the local dimming method is used to adjust the brightness values of achromatic color areas in consideration of a ratio of achromatic colors with respect to the number of pixels. That is, the local dimming method can save power by dimming pixels corresponding to dark areas in real time. A display apparatus that can perform the local dimming method can also perform the global dimming method.

Meanwhile, an organic light emitting diodes (OLED) display, which has attracted attention as a next-generation flat panel display, requires no BLU since a fluorescent organic compound itself emits light, unlike liquid crystal. The OLED display is classified as a passive matrix OLED (PMOLED) display or an active matrix OLED (AMOLED) display according to whether it can control light-emitting operations of display light-emitting devices individually. That is, an OLED display that can control display light-emitting devices individually can use the local dimming method.

A dimming method according to the present disclosure can be applied to various kinds of displays. For example, the dimming method according to the present disclosure may be applied to an OLED display having a display panel with display light-emitting devices, as well as an LCD with a BLU. Also, a display apparatus according to the present disclosure can use a local dimming method as well as a global dimming method. The present disclosure is characterized by dynamic dimming according to movement of an object that is displayed or to be displayed on a display apparatus. The display apparatus according to the present disclosure includes an LCD, an LED, an OLED, etc.

Hereinafter, a dimming method according to the present disclosure and a display apparatus using the dimming method will be described in detail with reference to drawings. The display apparatus 100 includes a display apparatus including a BLU, and the display apparatus 200 is a display apparatus including a display panel on which display light-emitting devices having self-luminosity are arranged, which will be described later with reference to FIGS. 13 and 14.

Figure 13:
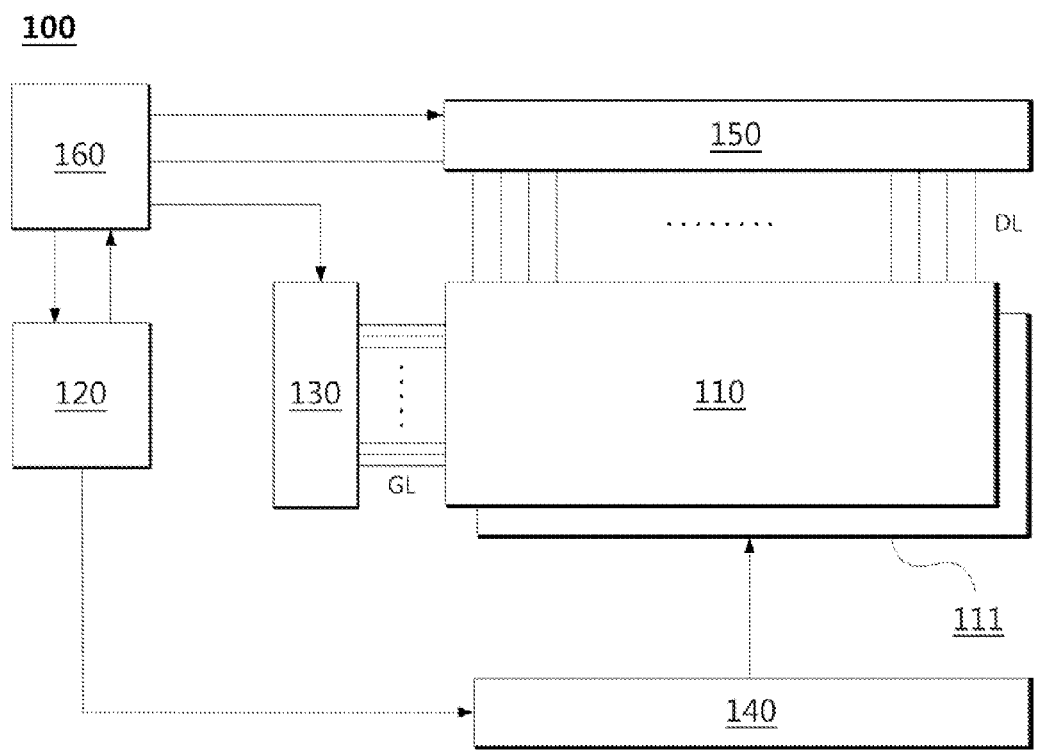
FIG. 13 is a block diagram schematically illustrating an example of a display apparatus including a backlight unit.
Figure 14:
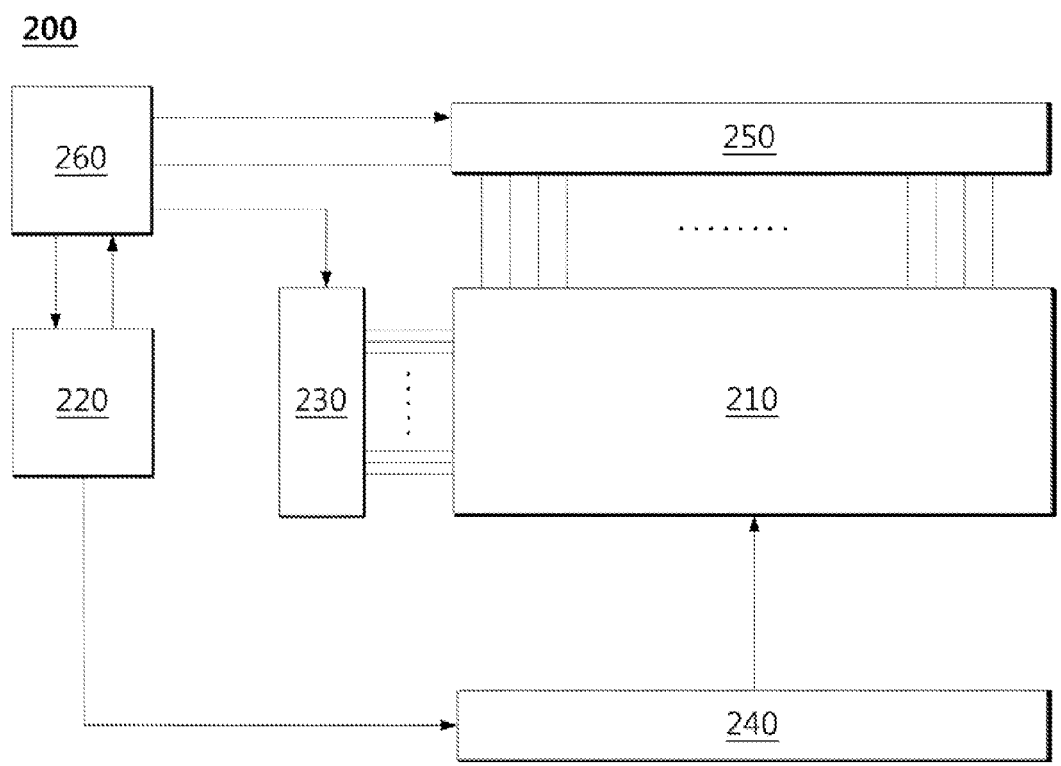
FIG. 14 is a block diagram schematically illustrating an example of a display apparatus including display light-emitting devices.

FIG. 1 is a flowchart illustrating an example of a dimming method that is performed by a display apparatus 100 or 200 (see FIGS. 13 and 14).

First, an image or video content is displayed on the display apparatus 100 or 200 (501). The content displayed on the display apparatus 100 or 200 is referred to as a content object. The content object includes various types of content, such as video, an image, a picture, text, a character string, etc., which can be displayed on the display apparatus 100 or 200 connected to a computer. Also, the content object may be a picture, or a combination of various kinds of content, such as a web browser screen in which images, streaming video, text, etc. are included. Also, the content object includes content such as a specific application that is executed by a mobile terminal, such as a smart phone, a tablet PC, etc.

After the content object is displayed on the display apparatus 100 or 200, the location or size of the content object is changed (502). If the content object moves, the location of the content object is changed, and if the content object is enlarged or reduced, the size of the content object is changed. The change in location or size of the content object generally depends on a user's specific input. For example, when the display apparatus 100 or 200 includes a touch panel, if the user drags or touches the touch panel, a specific content object may move. Also, if the user performs a pinch gesture on the touch panel to reduce a specific content object, the size of the content object is changed.

A change in location or size of a content object necessarily brings a change in velocity of the content object. If a content object moves, a velocity of the content object is generated, and if a content object is enlarged or reduced, the size of the content object changes and the velocity of the content object changes in an area in which the content object is displayed.

When the location of a content object changes, the velocity of the content object can be obtained by calculating a velocity at which a specific reference point such as the center point of the content object moves. For example, by counting the number of pixels through which the center point of a content object passes for a predetermined time period, the velocity of the content object can be calculated.

When the size of a content object changes, the velocity of the content object can be calculated by various methods. For example, the velocity of a content object whose size changes may be calculated based on the center point of the content object. The velocity of the content object may be calculated based on an outermost point to which the content object is enlarged. Also, the velocity of the content object may be calculated based on the changed area of the content object. That is, by calculating a ratio of an enlarged or reduced area of a content object with respect to the original area of the content object for a predetermined time period, the velocity of the content object can be obtained.

In response to a change in velocity of a content object, dimming starts. The display apparatus 100 or 200 or a computer connected to the display apparatus 100 or 200 calculates the velocity of the content object according to a change in location or size of the content object (503). The velocity of the content object that is displayed on the display apparatus 100 or 200 can be calculated by counting the number of pixels moving for a predetermined time period. In an actual display apparatus or computer, when or before a content object is displayed, the movement velocity of the content object can be calculated. Since a content object that is displayed on the display apparatus 100 or 200 corresponds to specific image data that is represented on the display apparatus 100 or 200, the velocity of the content object can be calculated by analyzing the specific image data.

The display apparatus 100 or 200 performs local dimming on the area of the content object or global dimming on the entire display area according to the velocity of the content object (504). For example, if the velocity of the content object is high, the display apparatus 100 or 200 may set the corresponding screen to a darker color, and if the velocity of the content object is low, no dimming may be performed. In the present disclosure, whether or not to perform dimming depends on the velocity of a content object.

For example, it is assumed that a user searches for another party's (recipient's) phone number in an address book of a mobile terminal such as a smart phone to place a call. If acquaintances' names are arranged in alphabetically descending order in the address book, an initial screen shows names starting with "A." If the user wants to call a person with a name "Kim," he or she flicks a phone number list of the address book to search for the person. Generally, since there are many persons' phone numbers between a list starting with "A" and a list starting with "K," the user tends to strongly flick the screen showing the phone number list to rapidly move the phone number list. Since the user is not interested in names starting with "B" or "C," he or she will not carefully view the screens showing the corresponding lists. As such, when the velocity of a content object increases according to a user's input, dimming may be performed on the corresponding content object area or the entire display area. That is, by dimming screens corresponding to areas in which a user is not interested, it is possible to reduce battery consumption. According to the present disclosure, times at which information loss caused by a dark screen is not important are determined according to the velocity of a content object, and dimming is performed according to the result of the determination. A method for dimming will be described later.

A content object area means an area in which the content object is displayed on the display apparatus 100 or 200. That is, a content object area means an area occupied by the content object on the entire display screen. The entire display area means the entire screen area of the display apparatus 100 or 200. A content object area is not necessarily a part of the display screen. For example, if a specific content object is displayed throughout the entire screen, the content object area is the same as the entire screen area.

Figure 2:
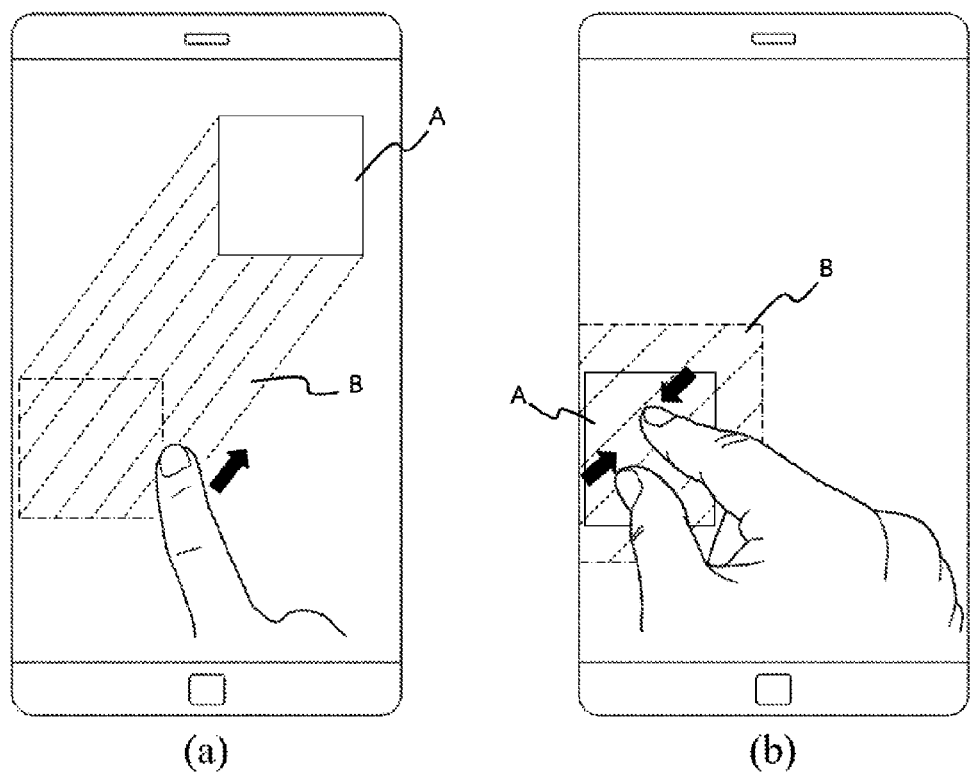
FIG. 2 shows examples for explaining content object areas.

FIG. 2 shows examples of content object areas. In (a) of FIG. 2, an area A is a content object area after a quadrangular content object moves, and an area B is a trace area made when the quadrangular content object moves from its original location. In (b) of FIG. 2, an area A is a content object area after a quadrangular content object is reduced, and an area B is a trace area made when the quadrangular content object is reduced from its original size.

A content object area is defined as an area in which the content object is displayed on a display apparatus 100 or 200. The area in which the content object is displayed includes two meanings. For example, as shown in FIG. 2, an area in which a content object is displayed includes a content object area A after the content object moves or the size of the content object changes, and a trace area B made when the content object moves or the size of the content object changes. Dimming may be performed on both the A and B areas or on one of the A and B areas. Also, dimming may be performed on a part of the A or B area, which will be described later.

The content object includes various kinds of content, such as a web browser on which news articles are displayed, a gallery application on which pictures are displayed, a player application on which video is played, an application including spread sheets, etc., which can be executed in a mobile terminal or a computer.

In order to distinguish local dimming that is performed on a specific area of a display screen from global dimming that is performed on the entire display screen, an area on which local dimming is performed is referred to a content object area, and an area on which global dimming is performed is referred to as an entire display area. That is, local dimming is performed only on a content object area, and global dimming is performed on the entire display area. If a content object area is the same as an entire display area, global dimming may be performed on the content object area.

FIG. 3 shows examples of interface methods for changing the locations or sizes of content objects that are displayed on the display apparatus 100 or 200. Basically, a change in velocity of a content object occurs according to a user's specific input.

(a) of FIG. 3 shows an example in which a user enlarges the size of a content object on the display apparatus 100 or 200 with a touch panel 50 according to a spread gesture. The user may input various kinds of commands using the touch panel 50. Representative inputs using the touch panel 50 include a single-touch input, a multi-touch input, a drag input, a flicking gesture input, a pinch gesture input, and a spread gesture input. Generally, inputs for changing the location of a content object include a drag input, a flicking gesture input, etc., and inputs for changing the size of a content object include pinch and spread gesture inputs using one hand or both hands, etc.

(b) of FIG. 3 shows an example of an input using a tilt sensor or a gyro sensor installed in a mobile terminal such as a smart phone. A user may incline a mobile terminal with a tilt sensor or a gyro sensor to change the location or size of a content object displayed on the display apparatus 100 or 200.

(c) of FIG. 3 shows an example of an input using a camera or an object-recognition sensor installed in a mobile terminal. When a user's finger passes through a specific area spaced from a mobile terminal, the gesture can be recognized as a command for changing the location or size of the corresponding content object.

(d) of FIG. 3 shows an example of an input using a mouse pad installed in a mobile terminal. If a user's finger touches and drags the mouse pad, the gesture can be recognized as a command for changing the location or size of the content object.

Although not shown in FIG. 3, various other types of inputs can be used. For example, a user's voice is received by a microphone and then recognized to change the location or size of the corresponding content object. As another example, a command for changing the location or size of a content object is received through a keypad installed in a mobile terminal.

The present disclosure is not limited by the kinds of inputs for changing the location or size of a content object. This is because dimming is performed according to whether or not the location or size of a content object changes. That is, the present disclosure can be applied depending to a change in velocity of a content object displayed on the display apparatus 100 or 200 even when there is no user's input.

As described above, although there are various methods and apparatuses capable of changing the velocity of a content object, the following description relates to the case in which a touch panel (50 of FIG. 3) is used.

Figure 4:
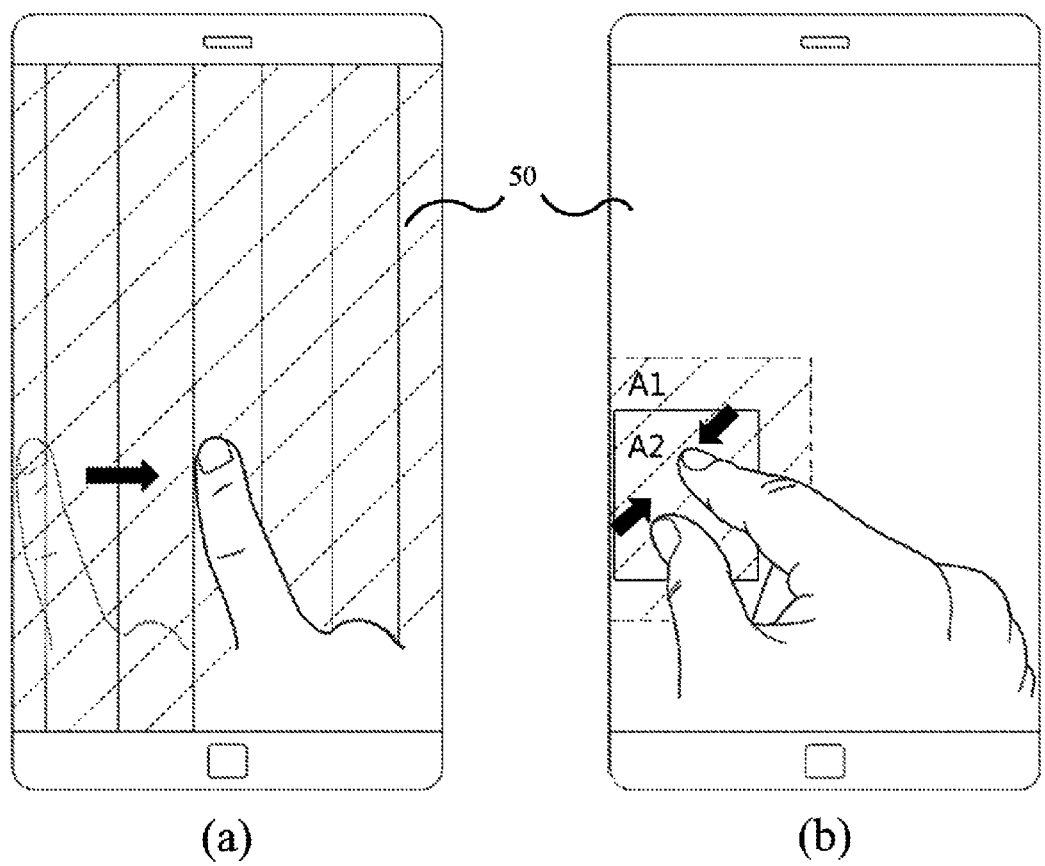
FIG. 4 is a view for explaining examples of global and local dimming methods, wherein (a) of FIG. 4 is a view for explaining an example of a global dimming method which is performed by a flicking gesture, and (b) of FIG. 4 is a view for explaining an example of a local dimming method which is performed by a pinch gesture.

(a) of FIG. 4 shows an example in which a global dimming method is performed. If a content object moves according to a flicking gesture, global dimming of the display apparatus 100 or 200 is performed according to the velocity of the content object whose location changes. The example (a) of FIG. 4 corresponds to the case in which dimming is performed on the entire display area denoted by oblique lines. If a user performs a flicking gesture on the touch panel 50 of the display apparatus 100 or 200, the entire screen moves to the right, and global dimming is performed on the entire display area.

(b) of FIG. 4 shows an example in which a local dimming method is performed. If the size of a content object is reduced by a pinch gesture, dimming is performed on the content object area according to a velocity at which the size of the content object is reduced. As shown in (b) of FIG. 4, when a user performs a pinch gesture on the touch panel 50 of the display apparatus 100 or 200, a quadrangular area A1 is reduced to a quadrangular area A2. The quadrangular areas A1 and A1 correspond to content object areas. If content displayed on a content object area is an image, when a user reduces the image, local dimming is performed only on the content object area. The example (b) of FIG. 4 corresponds to the case in which local dimming is performed only on a content object area. That is, when a content object is reduced, dimming is performed on the entire moving area. However, it is also possible for dimming to be performed only on a part of the content object area A1, rather than on the entire content object area A1. For example, dimming may be performed only on the part of the content object area A1 other than the content object area A2. Various other dimming methods will be described later.

FIG. 5 shows examples of graphs showing the degree of dimness with respect to the velocity of a content object when a dimming method is performed by the display apparatus 100 or 200. In the graphs shown in FIG. 5, the horizontal axes represent the velocity of a content object, and the vertical axes represent the degree of dimness. If a degree of dimness is referred to as a dimming value, a dimming value of "0" corresponds to the case in which no dimming is performed, and a dimming value of "1" corresponds to the case in which dimming is maximally performed. Although the graphs shown in (a) and (b) of FIG. 5 are different from each other, both graphs show that as the velocity of a content object increases, a dimming value increases accordingly. In other words, as the velocity of a content object increases, a light output that is generated by the display apparatus 100 or 200 decreases.

The relationship between the velocity of a content object and the dimming value is stored in the form of a data table in a memory of the display apparatus 100 or 200. If the velocity of a content object is calculated by the display apparatus 100 or 200 or a computer, a dimming value corresponding to the velocity of the content object is searched for in the data table, and dimming is performed with the found dimming value. In the example (a) of FIG. 5, a dimming value may increase linearly with respect to the velocity of a content object, and in the example (b) of FIG. 5, a dimming value may increase sharply with respect to the velocity of a content object. The relationship between the velocities of a content object and dimming values may be set to be expressed as graphs in various shapes according to the display apparatus 100 or 200, the kind of content, a user's setting, etc.

According to another example, dimming may be performed only when the velocity of a content object exceeds a predetermined value (a threshold value). As shown in the examples of FIG. 5, when the velocity of a content object exceeds a predetermined threshold value (Threshold), dimming may be performed.

Figure 6:
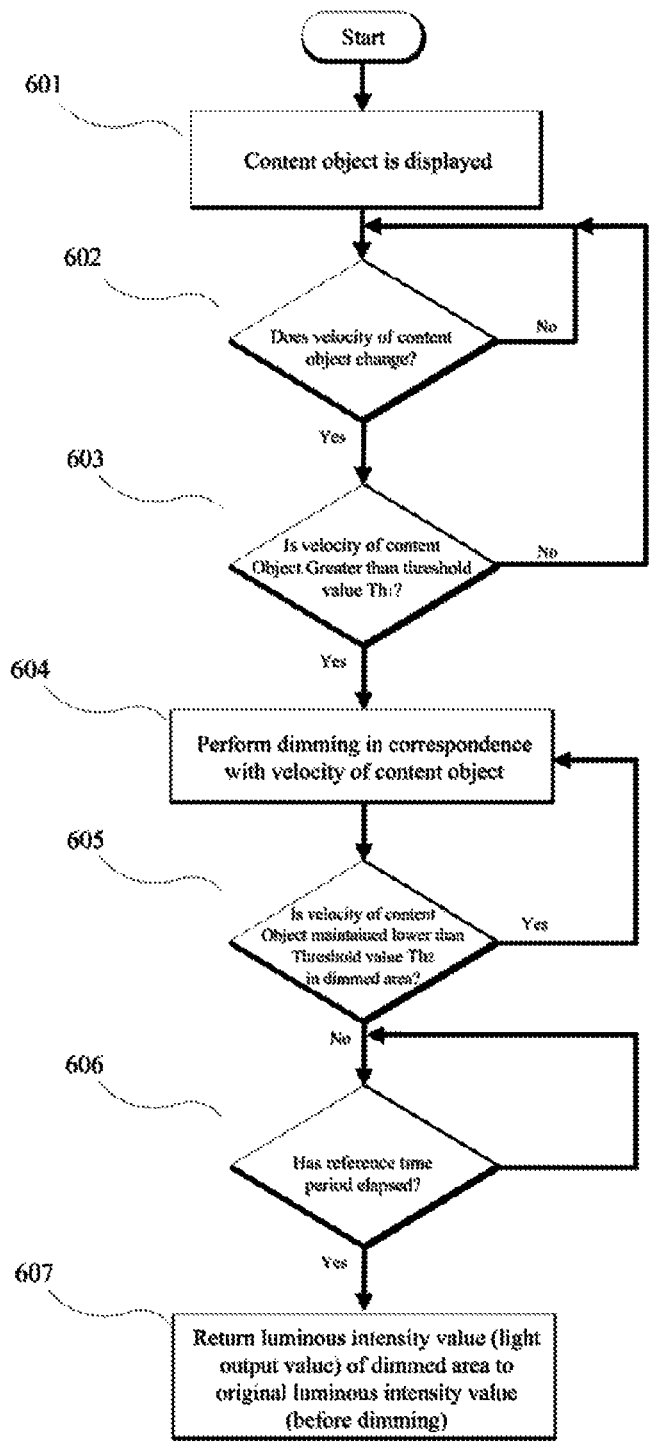
FIG. 6 is a flowchart illustrating another example of a dimming method that is performed by a display apparatus.

FIG. 6 is a flowchart illustrating another example of a dimming method that is performed by the display apparatus 100 or 200. First, a content object is displayed on the display apparatus 100 or 200 (601). Then, it is determined whether the velocity of the content object displayed on the display apparatus 100 or 200 changes (602).

In the present disclosure, determination and control operations are performed by a device that can perform control operations, such as a control unit connected to the display apparatus 100 or 200, a computer connected to the display apparatus 100 or 200, a dimming control circuit connected to the display apparatus 100 or 200, etc.

If the velocity of the content object changes, it is determined whether the velocity of the content is greater than a first threshold value $Th_1$ (603). If the velocity of the content object is smaller than the first threshold value $Th_1$, it continues to be determined whether the velocity of the content object changes or whether the velocity of the content object is greater than the first threshold value $Th_1$.

If the velocity of the content object is greater than the first threshold value $Th_1$, dimming is performed in correspondence with the velocity of the content object (604). As described above, a higher velocity of the content object corresponds to a lower light output value. If the velocity of the content object is equal to the first threshold value $Th_1$, dimming is performed or not performed according to a setting.

Thereafter, it continues to monitor whether the velocity of the content object changes in the content object area or the entire display area on which dimming has been performed (605), and if the velocity of the content object changes to be greater than a second threshold value $Th_2$, dimming is performed again in correspondence with the velocity of the content object (604). Generally, the second threshold value $Th_2$ is equal to the first threshold value $Th_1$. However, the second threshold value $Th_2$ may be different from the first threshold value $Th_1$ according to a setting.

It is determined whether the velocity of the content object is lower than the second threshold value $Th_2$ in the dimmed area (605). If the velocity of the content object is lower than the second threshold value $Th_2$, it is determined whether a reference time period has elapsed (606). If the reference time period has elapsed while the velocity of the content object is maintained lower than the second threshold value $Th_2$, the dimmed area is controlled to have its original luminous intensity value (607). Generally, the dimmed area is controlled to have its original light output value before it is dimmed.

The threshold values $Th_1$ and $Th_2$ and the reference time period may be set by a user or according to the characteristics of the display apparatus 100 or 200. Also, the threshold values $Th_1$ and $Th_2$ and the reference time period may be automatically adjusted according to an environmental factor such as peripheral luminous intensity. Also, only when the remaining capacity of a battery that supplies power to the display apparatus 100 or 200 is low, dimming may be performed using one of the threshold values $Th_1$ and $Th_2$ and the reference time period.

The flowchart illustrated in FIG. 6 is only exemplary. That is, only one of the threshold values $Th_1$ and $Th_2$ and the reference time period may be used, or dimming may continue to be performed according to the velocity of a content object without being subject to criteria such as the threshold values $Th_1$ and $Th_2$ or the reference time period. However, since performing dimming too frequently increases power consumption, setting an appropriate threshold value and reference time period is effective in reducing battery consumption.

Hereinafter, other examples of dimming methods will be described with reference to drawings.

Figure 7:
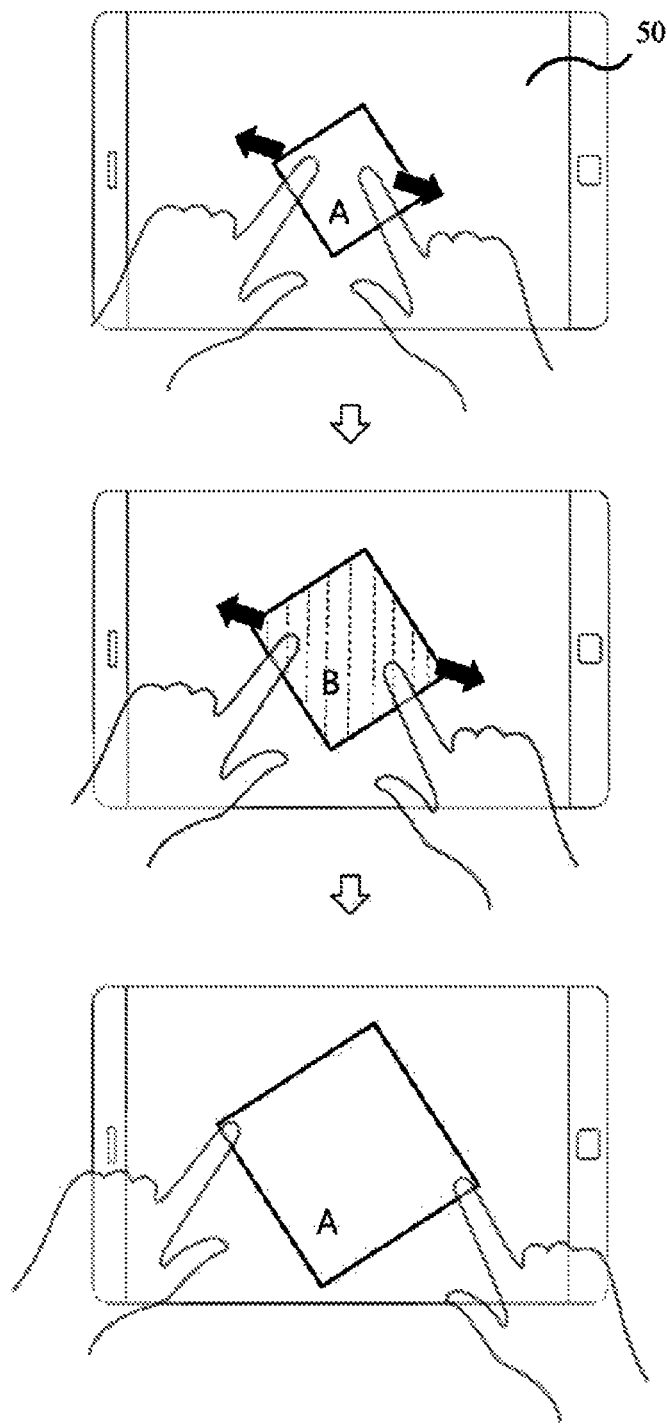
FIG. 7 is a view for explaining an example of a local dimming method according to the velocity of a content object.

FIG. 7 is a view for explaining an example of a local dimming method according to a spread gesture. The example of FIG. 7 corresponds to local dimming according to the velocity of a content object. In the example of FIG. 7, a user performs a spread gesture with his or her hands to enlarge a content object. The content object shown in the display apparatus 100 or 200 has a quadrangular shape, and when the user performs a spread gesture to enlarge the content object, local dimming is performed in the content object area. If the luminous intensity value of the content object area is A before dimming is performed, the content object area is dimmed to have a luminous intensity value B according to the velocity of the content object, wherein the content object area dimmed with the luminous intensity value B is darker than the background, and when the user stops enlarging the content object, the luminous intensity value of the enlarged content object returns to its original luminous intensity value A.

Figure 8:
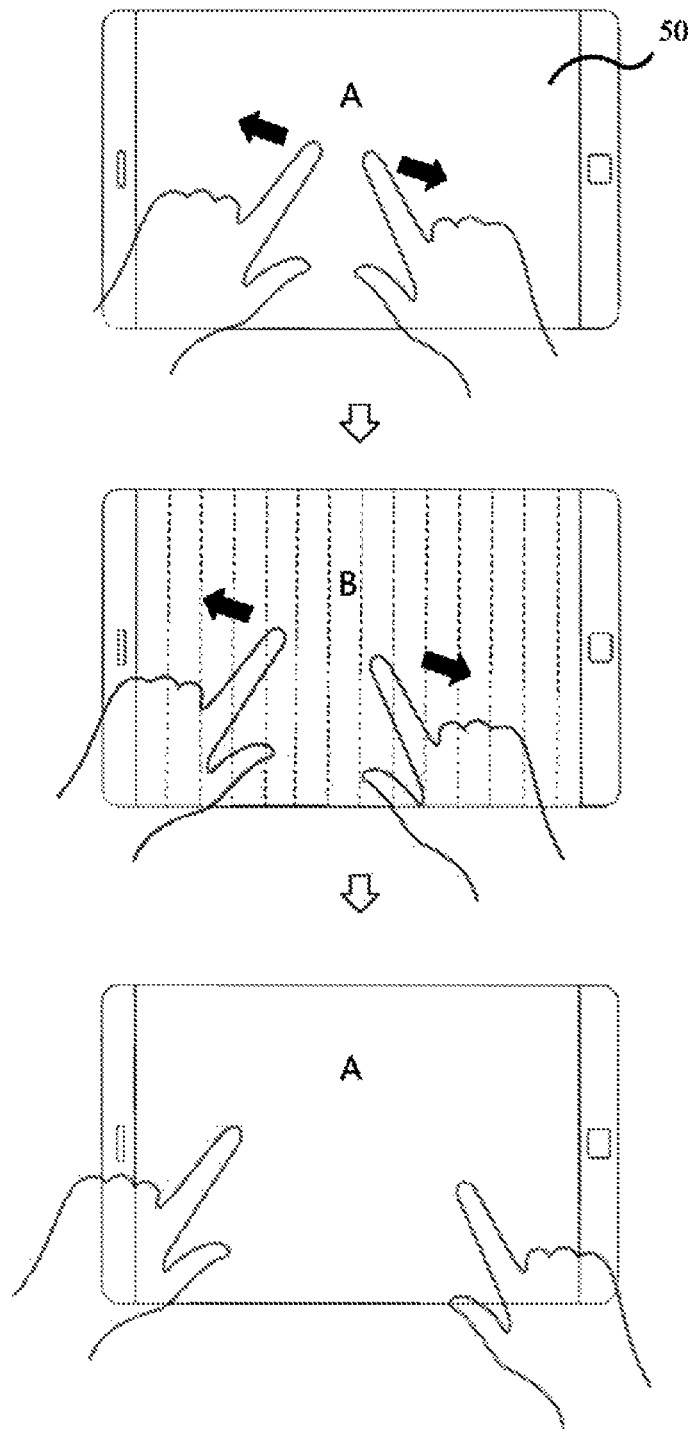
FIG. 8 is a view for explaining an example of a global dimming method according to the velocity of a content object.

FIG. 8 is a view for explaining an example of a global dimming method according to a spread gesture. The example of FIG. 8 corresponds to global dimming according to the velocity of a content object. In the example of FIG. 8, a user performs a spread gesture with his or her hands to enlarge a content object. Unlike FIG. 7, in FIG. 8, the content object is displayed throughout the entire display area. When the user performs a spread gesture to enlarge the content object, global dimming is performed in the entire display area. If the luminous intensity value of the content object area is A before dimming is performed, the content object area is dimmed to have a luminous intensity value B according to the velocity of the content object, wherein the content object area dimmed with the luminous intensity value B is darker than the background, and when the user stops enlarging the content object, the luminous intensity value of the enlarged content object returns to its original luminous intensity value A.

Hereinafter, various examples of performing dimming on a content object area or an entire display area will be described with reference to drawings.

Figure 9:
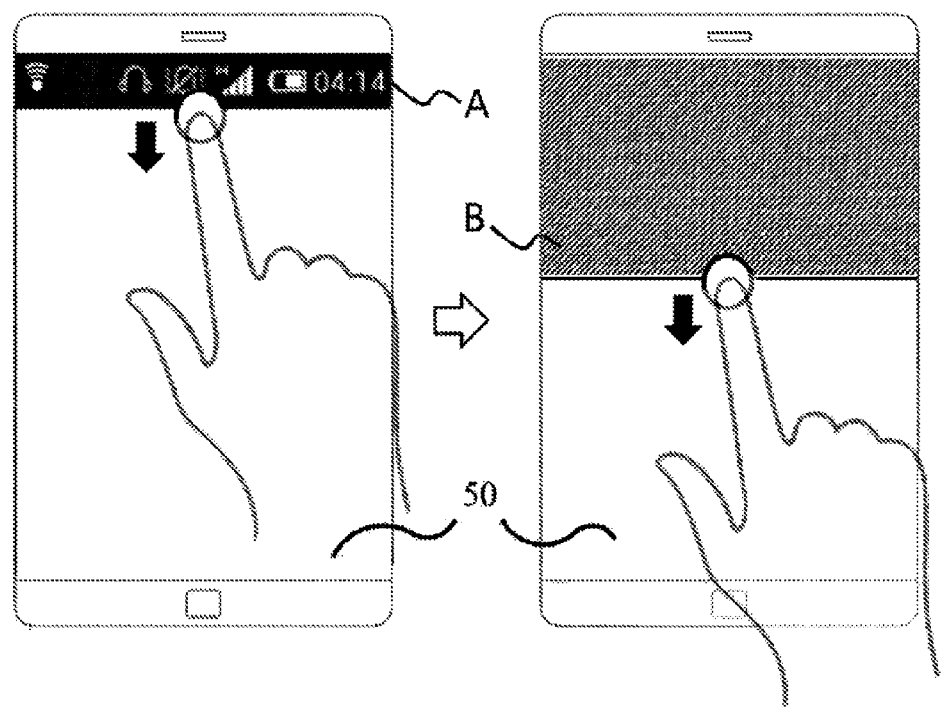
FIG. 9 is a view for explaining an example of a dimming method according to a drag gesture.

FIG. 9 is a view for explaining an example of a dimming method according to a drag gesture. FIG. 9 shows operation of dragging a content object displayed on the display apparatus 100 or 200 in a downward direction. That is, the example of FIG. 9 corresponds to the case in which a user drags a content object displayed on the upper portion of a display screen downward.

The left part of FIG. 9 shows the moment at which the user clicks a task bar of a mobile device such as a smart phone in order to drag the task bar downward. At this time, the task bar which is a content object has a light output value A. The right part of FIG. 9 shows the moment at which the user drags the task bar downward to enlarge the display area of the task bar. According to a velocity at which the task bar is dragged downward, an area (that is, a content object area) on which the task bar is displayed is dimmed to have a light output value B, wherein the light output value B<the light output value A. The example of FIG. 9 is the case of dimming a content object area that is newly displayed on a display apparatus 100 or 200.

Figure 10:
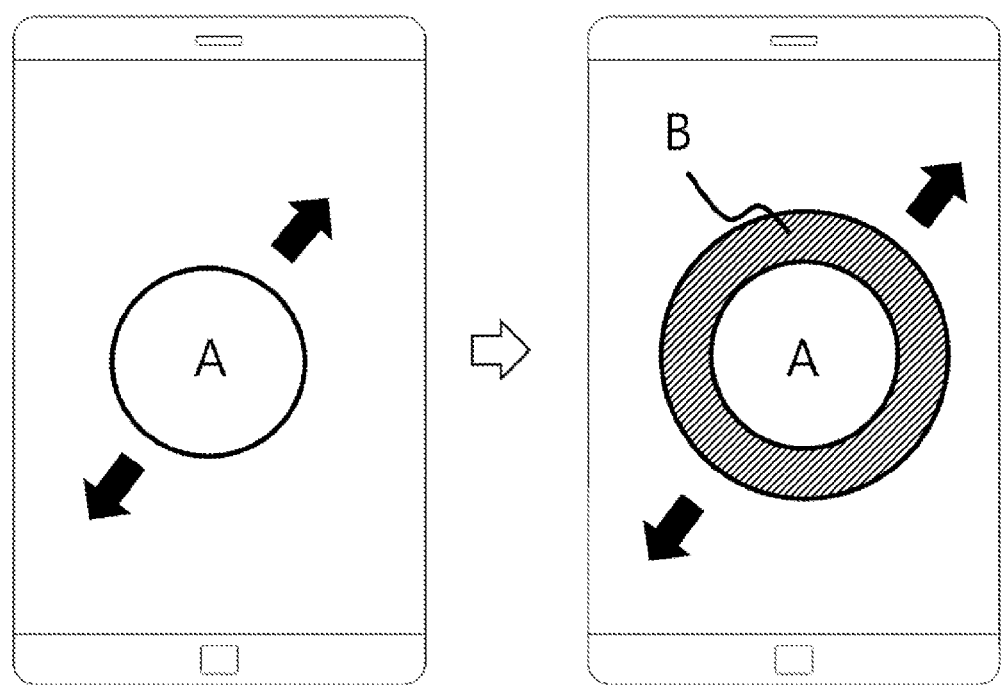
FIG. 10 is a view for explaining an example in which display areas are dimmed with different dimming values on a display apparatus when a content object is enlarged according to a spread gesture.

FIG. 10 is a view for explaining an example in which display areas are dimmed with different dimming values on the display apparatus 100 or 200 when a content object is enlarged. The example of FIG. 10 is the case in which the content object is circular in shape. When a user enlarges the size of the content object, the user is generally interested in content included in the inside area of the content object. For example, the user may enlarge a picture displayed on the display apparatus 100 or 200.

The left part of FIG. 10 shows the content object before it is enlarged. Before the content object is enlarged, the content object has a light output value A. The right part of FIG. 10 shows an enlarged state of the content object. As shown in the right part of FIG. 10, an area around the center of the enlarged content object remains at the light output value A, and an area surrounding the area having the light output value A is dimmed to have a light output value B. Hereinafter, the area around the center of the enlarged content object, in which the user is interested, is referred to as an inside area, and the area surrounding the center area is referred to as an outside area. In detail, the inside area means an area within a short distance range from the center of the content object, in which the user is interested, and the outside area means the remaining area starting from a border at which the inside area ends, or an area within a predetermined distance range from the border at which the inside area ends. In FIG. 10, the area having the light output value B corresponds to an outside area. That is, the outside area is an area on which dimming is performed.

In FIG. 10, the content object is circular in shape, and the inside and outside areas are also circular in shape. However, the inside and outside areas may be various shapes, such as a circle, a square, a rectangle, a polygon, etc., according to the shape of the content object.

Unlike the example of FIG. 10, it is also possible to perform dimming on the entire remaining display area excluding the inside area. As described above, this is the case in which the entire display area excluding the inside area is an outside area.

There are various methods in which dimming is performed on the outside area, as follows. First, dimming may be performed such that the entire outside area has the same light output value. Second, dimming may be performed such that a part of the outside area has a lower light output value as it is more distant from the inside area. In other words, light output values may be reduced in the outer radial direction from a border at which the inside area ends. Third, an outside area may be divided into predetermined areas according to the distance from an inside area, and dimming may be performed with different light output values on the divided areas in such a manner that areas located more distant from the inside area have lower light output values. That is, a divided area has the same light output value.

In contrast to the example of FIG. 10, when a content object is reduced, a user is generally interested in an area that newly appears. In this case, an inside area may be dimmed. As a result, in the present disclosure, an area on which dimming is performed is the remaining area excluding an area in which a user is interested, or a part of the remaining area. It is also possible to reduce light output values in the inner radial direction from a border at which the outside area of the content object ends.

Figure 11:
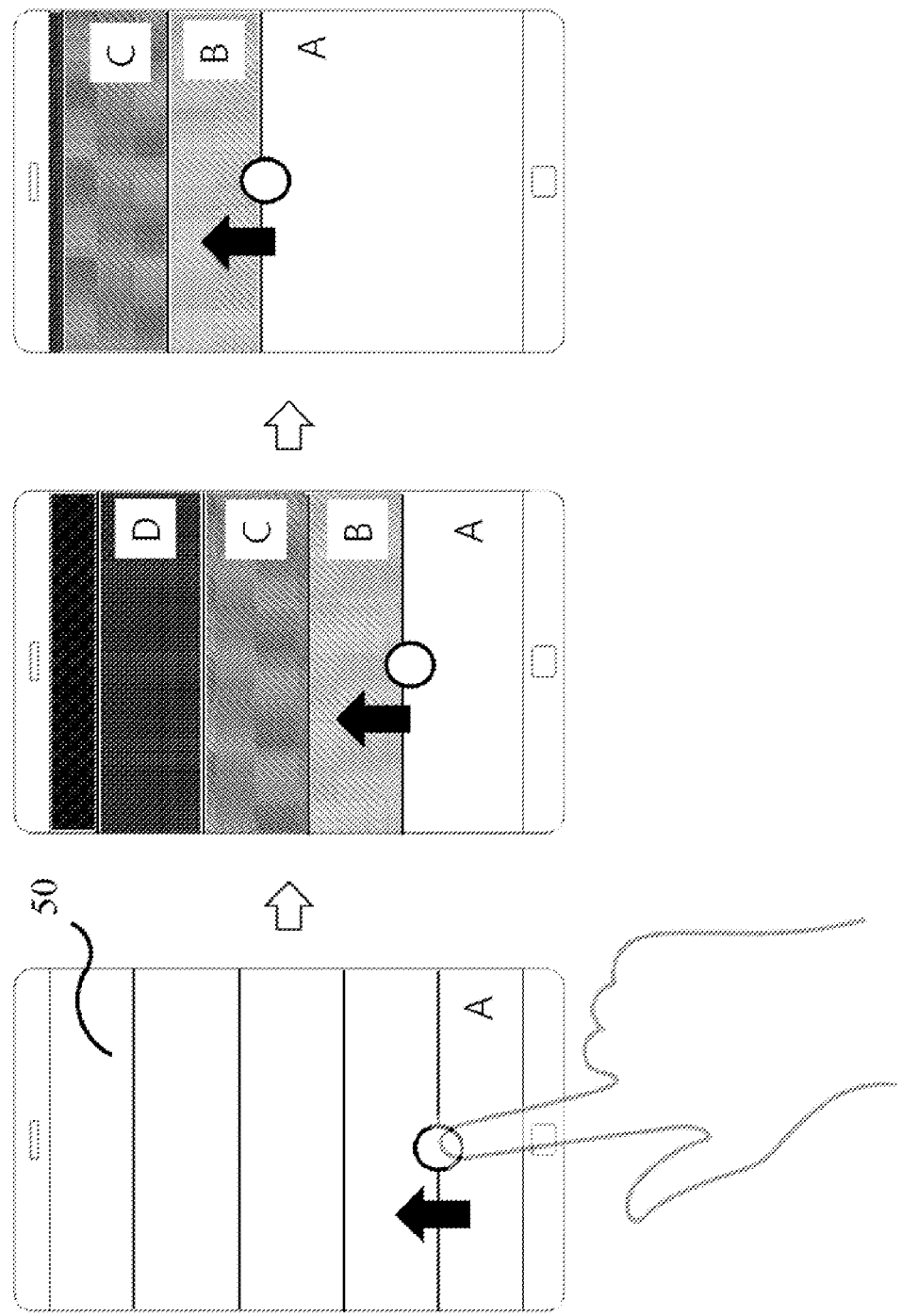
FIG. 11 is a view for explaining an example in which display areas are dimmed with different dimming values on a display apparatus when a content object moves according to a flicking gesture.

FIG. 11 is a view for explaining an example in which display areas are dimmed with different dimming values on the display apparatus 100 or 200 when a content object moves according to a flicking gesture. A user clicks the lower part of a touch panel of the display apparatus 100 or 200, and performs a flicking gesture in an upward direction denoted by an arrow. Accordingly, the content object displayed on the display apparatus 100 or 200 moves in the upward direction. An area that newly appears according to the movement of the content object may be an area of interest. The newly appearing area is referred to as a new content area. In FIG. 11, an area having a light output value A corresponds to a new content area.

In this case, dimming is performed on the remaining area excluding the new content area. The center part of FIG. 11 shows the state in which dimming has been performed such that light output values are reduced in the movement direction of the new content area from a border at which the new content area starts. The light output values are A>B>C>D.

Also, dimming may be performed such that the entire remaining area excluding the new content area has the same light output value. The example of FIG. 9 corresponds to the case of dimming a moving content object, whereas the example of FIG. 11 corresponds to the case of dimming the remaining area excluding a newly appearing content area.

Figure 12:
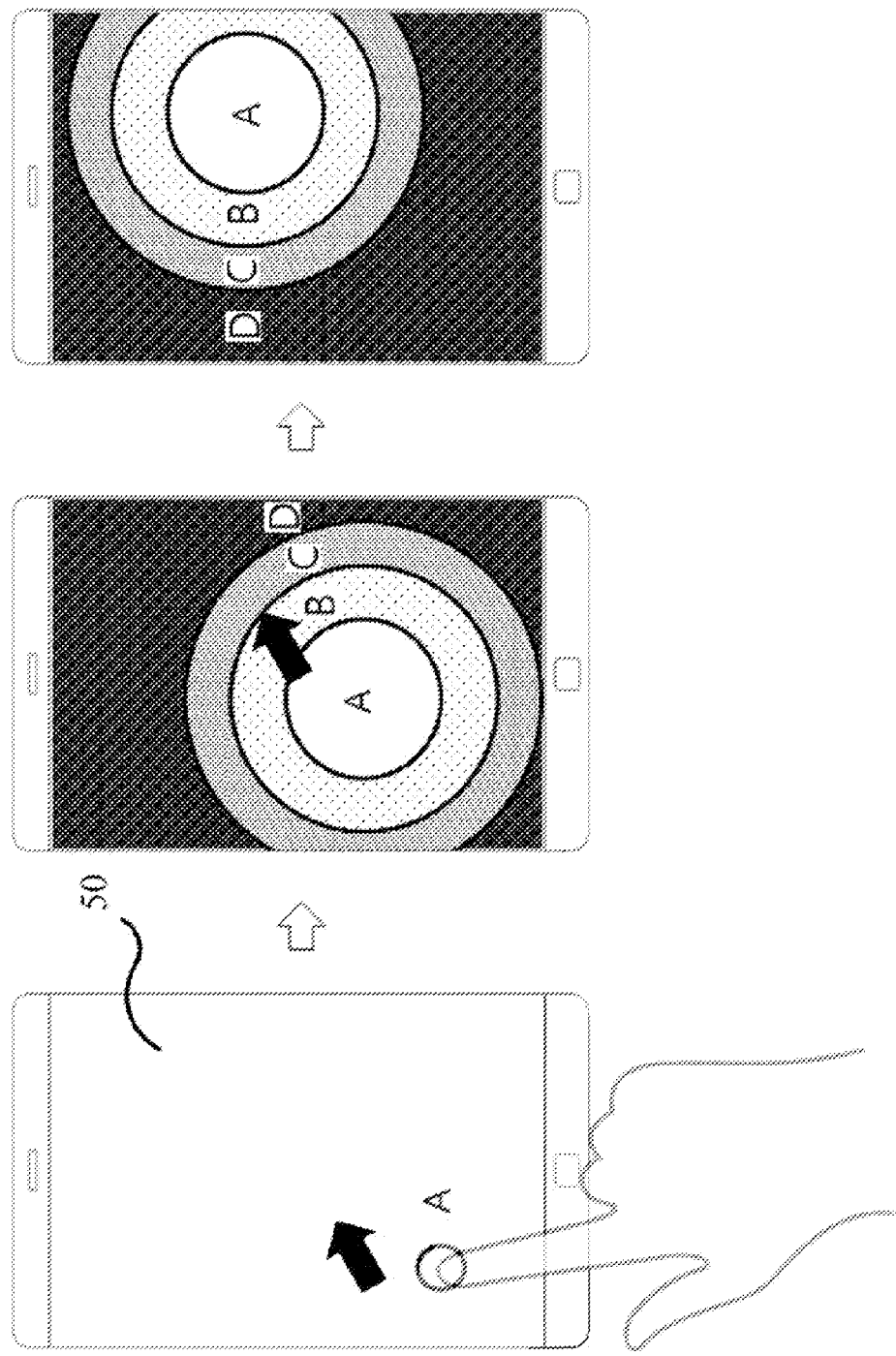
FIG. 12 is a view for explaining an example in which display areas are dimmed with different dimming values on a display apparatus when a content object moves according to a drag gesture

FIG. 12 is a view for explaining an example in which display areas are dimmed with different dimming values on the display apparatus 100 or 200 when a content object moves according to a drag gesture. The example of FIG. 12 corresponds to the case in which a user clicks and drags a touch panel 50 of the display apparatus 100 or 200 to move a content object. The inside area of the moving content object is not dimmed, and areas that are more distant from the inside area are dimmed with darker colors.

When a user moves a content object, he or she is generally interested in the content object itself. Accordingly, as shown in FIG. 12, areas that are more distant from the inside area of a content object are dimmed with darker colors. In other words, light output values may be reduced in the outer radial direction from a border at which the inside area ends.

FIG. 12 shows an example in which a display area is divided into several areas according to a distance from the center of a content object, and the divided areas are dimmed with different light output values A, B, C, and D. In the example of FIG. 12, the light output values are A>B>C>D.

Also, the inside area of the content object may be not dimmed, and the remaining area excluding the inside area may be dimmed with the same value.

The dimming method may be implemented by hardware, for example, a chipset, or by software. When the dimming method is implemented by software, the dimming method may be implemented by the display apparatus 100 or 200 without having to add hardware. Hereinafter, the display apparatus 100 or 200 to which the dimming method can be applied will be described.

FIG. 13 is a block diagram schematically illustrating an example of the display apparatus 100 including a BLU.

Referring to FIG. 13, the display apparatus 100 includes a display panel 110, a BLU 111, a timing controller 160, a data driving circuit 150, a gate driving circuit 130, a dimming control circuit 120, and a backlight driving circuit 140.

The display panel 110 shown in FIG. 13 may be an LCD panel requiring the BLU 111 as a light source.

The LCD panel includes two glass substrates and a liquid crystal layer interposed therebetween. On the lower glass substrate of the LCD panel, a plurality of data lines DL and a plurality of gate lines GL intersecting the data lines DL are formed. By the intersection structure of the data lines DL and the gate lines GL, liquid crystal cells are arranged in a matrix form on the LCD panel. Each liquid crystal cell includes a TFT, a pixel electrode connected to the TFT, a storage capacitor, etc. On the upper glass substrate of the LCD panel, black matrices, color filters, common electrodes, etc. are formed. The common electrodes are formed on the upper glass substrate when a vertical field driving mode such as a twisted nematic (TN) mode or a vertical alignment (VA) mode is used, and the common electrodes are formed on the lower glass substrate together with the pixel electrodes when a horizontal field driving mode such as an in-plane switching (IPS) mode or a fringe field switching (FFS) mode is used. The liquid crystal cells include R liquid crystal cells for displaying red, G liquid crystal cells for displaying green, and B liquid crystal cells for displaying blue. An R liquid crystal cell, a G liquid crystal cell, and a B liquid crystal cell configure a unit pixel.

The timing controller arranges image data RGB received from a system board in which an external video source is installed to supply the image data RGB to the dimming control circuit 120, and supplies modulated data R'G'B' received from the dimming control circuit 120 to the data driving circuit 150. The timing controller 160 generates timing control signals for controlling the operation timings of the data driving circuit 150 and the gate driving circuit 130 based on timing signals received from the system board. The timing controller 160 may insert interpolation frames between frames of an input image signal received at a frame frequency of 60 Hz, and control the operations of the data driving circuit 150 and the gate driving circuit 130 using a data timing control signal and a gate timing control signal.

The data driving circuit 150 includes a plurality of data drive integrated circuits. The data driving circuit 150 converts the modulated data R'G'B' into a positive/negative analog data voltage under the control of the timing controller 160, and supplies the positive/negative analog data voltage to the data lines DL connected to the display panel 110.

The gate driving circuit 130 includes a plurality of gate drive integrated circuits. Each gate drive integrated circuit includes a shift register, a level shifter for converting the output signal of the shift register into a signal with a swing width suitable for driving the TFT of a liquid crystal cell, an output buffer, etc. The gate driving circuit 130 outputs a scan pulse (or a gate pulse) sequentially to the gate lines GL to select horizontal lines to which a data voltage is applied, under the control of the timing controller 160.

The dimming control circuit 120 analyzes image data RGB corresponding to a frame, and decides dimming values for controlling the light sources of the BLU 111 based on dimming brightness values. The dimming control circuit 120 may perform local dimming on a specific content object area, or may perform global dimming on an entire display area.

The backlight driving circuit 140 drives the light sources of the BLU 111 using pulse width modulation (PWM) according to dimming values received from the local dimming control circuit 120.

The BLU 111 includes a plurality of light sources to radiate light to the display panel 110. The BLU 111 may be implemented as one of a direct type and an edge type. The light sources may be implemented as point light sources such as light emitting diodes.

In the display apparatus 100, the display panel 110 displays content images, the BLU 111 includes a plurality of light sources to radiate light to the back side of the display panel 110, and the dimming control circuit 120 calculates the velocity of a content object displayed on the display panel 110, and adjusts the light output of the BLU 111, which is radiated to a content object area at which the content object is displayed on the display panel 110 or to an entire display area including the content object area, according to the velocity of the content object.

Although not shown in FIG. 13, the display apparatus 100 may further include an interface unit 170 that receives a signal for changing the location or size of a content object. As described above, the interface unit 170 may include at least one of a voice recognition device including a microphone, an image recognition device including a camera, a tilt recognition device including a tilt sensor, an angular velocity recognition device including a gyro sensor, an acceleration recognition device including an acceleration sensor, a motion recognition device including a magnetic sensor, a keypad, and a mouse pad.

If the interface unit 170 is a touch panel, a signal for changing the location or size of a content object may be at least one of a touch input, a multi-touch input, a drag input, a flicking gesture input, a pinch gesture input, and a spread input, which is input to the touch panel. The interface unit 170 senses a signal for changing the location or size of a content object, input by a user.

The dimming control circuit 120 adjusts the light output of the BLU 111, which is radiated to a content object area or an entire display area on the display panel 110, such that the light output has a lower value at the higher velocity of the content object.

The dimming control circuit 120 may further include a dimming value memory that stores a dimming table for matching the velocity of a content object with a light output value. The dimming control circuit 120 receives information about a calculated velocity of a content object or calculates the velocity of a content object, searches for a dimming value corresponding to the velocity of the content object in the dimming value memory, and transfers the found dimming value to the backlight driving circuit 140.

FIG. 14 is a block diagram schematically illustrating an example of the display apparatus 200 to which the dimming method is applied. The display apparatus 200 includes a plurality of display light-emitting devices having self-luminosity and arranged on a display panel. Accordingly, unlike the example of FIG. 13, the display apparatus 200 requires no separate light source such as the BLU 111. The display apparatus 200 shown in FIG. 14 may be an OLED display.

Referring to FIG. 14, the display apparatus 200 includes a display panel 210, a timing controller 260, a data driving circuit 250, a gate driving circuit 230, a dimming control circuit 220, and a light-emitting device driving circuit 240. Unlike the display apparatus 100 shown in FIG. 13, the display apparatus 200 shown in FIG. 14 requires no BLU 111, and includes the light-emitting device driving circuit 240 to directly control the display light-emitting devices arranged on the display panel 210. Since the other components shown in FIG. 14 are the same as the corresponding components shown in FIG. 13, a detailed description thereof will be omitted here.

The display apparatus 200 illustrated in FIG. 14 includes the display light-emitting devices, the display panel 210 that displays content images, and the dimming control circuit 220 that determines the velocity of a content object displayed on the display panel 210, and adjusts the light outputs of display light-emitting devices in a content object area at which the content object is displayed on the display panel 110 or in an entire display area including the content object area, according to the velocity of the content object.

The display apparatus 200 shown in FIG. 14 has the same configuration as the display apparatus 100 shown in FIG. 13 except that the display light-emitting devices are arranged on the display panel 210, and the dimming control circuit 220 of FIG. 14 performs the same operation as the dimming control circuit 120 of FIG. 13 except that the dimming control circuit 220 directly controls the display light-emitting devices arranged on the display panel 210 instead of the BLU 111.

Also, the dimming method according to the present disclosure, as described above, may be applied to an apparatus for displaying content in a manner to radiate images, such as a projector. For example, the dimming method according to the present disclosure may be applied to a tabletop interface apparatus, a projector apparatus, a mobile projector apparatus, etc.

Figure 15:
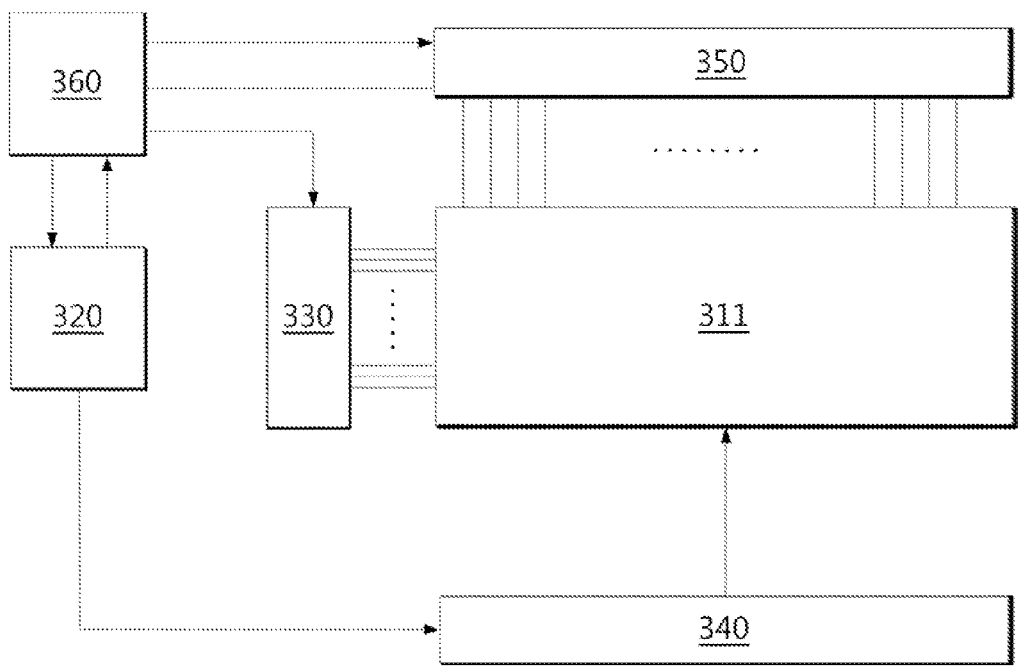
FIG. 15 is a block diagram schematically illustrating an example of the display apparatus including a projection device.

FIG. 15 is a block diagram schematically illustrating an example of the display apparatus 300. Referring to FIG. 15, the display apparatus 300 includes a light source unit 311 that includes a plurality of light sources and radiates light to an external screen to display content images, a timing controller 360, a data driving circuit 350, a gate driving circuit 330, a dimming control circuit 320, and a light-emitting device driving circuit 340.

A display apparatus 300 according to the present disclosure includes a light source unit 311 that includes a plurality of light sources and radiates light to an external screen to display content images, and a dimming control circuit 320 that calculates the velocity of a content object displayed on the external screen and adjusts the output value of light to be radiated to a content object area at which the content object is displayed on the external screen or to an entire display area including the content object area.

The dimming control circuits 120, 220, and 320 that are respectively included in common in the display apparatus illustrated in FIG. 13, the display apparatus 200 illustrated in FIG. 14, and the display apparatus 300 will be further described, below.

The dimming control circuits 120, 220, and 320 adjust a light output value such that the light output value decreases as the velocity of a content object increases.

If the velocity of a content object becomes zero after a light output value is adjusted, the dimming control circuits 120, 220, and 320 may return the adjusted light output value to its original light output value before it was adjusted after a reference time period has elapsed from when the velocity of the content object became zero.

Also, the dimming control circuits 120, 220, and 320 may adjust a light output value only when the velocity of a content object exceeds a threshold value. In this case, if the velocity of a content object is maintained lower than the threshold value for a reference time period after the light output values of light sources are adjusted, the dimming control circuits 120, 220, and 320 may return the adjusted light output values to their original light output values before the light output values are adjusted.

If the location of a content object is changed, the dimming control circuits 120, 220, and 320 adjust the optical output values of light sources that radiate light to the remaining area excluding the moved content object area, or adjust the light output values of display light-emitting devices in the remaining area. In this case, the dimming control circuits 120, 220, and 320 may adjust the light output values of the light sources such that the light sources output lower light output values at locations that are more distant from a border at which the moved content object area ends along the movement trace of the content object area.

When the location of the content object is changed, the dimming control circuits 120, 220, and 320 adjust the light output values of light sources that radiate light to the remaining area of the content object area excluding the inside area, or adjust the light output values of display light-emitting devices in the remaining area. In this case, the dimming control circuits 120, 220, and 320 may adjust the light output values of the light sources such that the light sources output lower light output values in the outer radial direction from a border at which the inside area ends.

If the size of a content object is enlarged, the dimming control circuits 120, 220, and 320 adjust the light output values of light sources that radiate light to the remaining area of the content object area excluding the inside area, or adjust the light output values of display light-emitting devices in the remaining area. In this case, the dimming control circuits 120, 220, and 320 may adjust the light output values of the light sources or the display light-emitting devices such that the light sources or the display light-emitting devices output lower light output values at locations that are more distant in the outer radial direction from a border at which the inside area ends.

If the size of a content object is reduced, the dimming control circuits 120, 220, and 320 adjust the light output values of light sources that radiate light to the remaining area of the content object area excluding the outside area, and adjust the light output values of display light-emitting devices in the remaining area. In this case, the dimming control circuits 120, 220, and 320 may adjust the light output values of the light sources or the display light-emitting devices such that the light sources or the display light-emitting devices output lower light output values at locations that are more distant in the inner radial direction from a border at which the outside area of the content object ends.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display apparatus, comprising:
    an interface unit configured to receive a user's input;
    a display panel on which a content object is displayed; and
    a dimming control circuit configured
        to dim a content object area at which the content object is displayed on the display panel according to a velocity of the content object moving by the user's input, by adjusting brightness of light radiated to the display panel in inverse proportion to the velocity of the content object, wherein the velocity of the content object changes by the user's input on the interface unit.

2. The display apparatus of claim 1, wherein the user's input is for changing the location or size of the content object.

3. The display apparatus of claim 1, wherein the interface unit is a touch panel, and the user's input is a touch input, a multi-touch input, a drag input, a flicking gesture input, a pinch gesture input, or a spread gesture input.

4. The display apparatus of claim 1, wherein the interface unit is at least one of an image recognition device including a camera, a tilt recognition device including a tilt sensor, an angular velocity recognition device including a gyro sensor, an acceleration recognition device including an acceleration sensor, a motion recognition device including a magnetic sensor, a keypad, and a mouse pad.

5. The display apparatus of claim 1, wherein the dimming control circuit comprises a dimming value memory configured to store a dimming table for matching the velocity of the content object with a value of the brightness.

6. The display apparatus of claim 1, wherein the dimming control circuit adjusts the brightness of the light if the velocity exceeds a threshold value.

7. The display apparatus of claim 1, wherein the dimming control circuit configured to dim a display area including the content object area according to the velocity of the content object, by adjusting brightness of light radiated to the display area in inverse proportion to the velocity of the content object.

8. A display apparatus including a plurality of display light-emitting devices, comprising:
    an interface unit configured to receive a user's input;
    a display panel which includes the plurality of display light-emitting devices, and on which a content object is displayed; and
    a dimming control circuit configured
        to dim a content object area at which the content object is displayed on the display panel according to a velocity of the content object moving by the user's input, by adjusting brightness of light radiated from the display light emitting devices to the content object area in inverse proportion to the velocity of the content object, wherein the velocity of the content object changes by the user's input on the interface unit.

9. The display apparatus of claim 8, wherein the user's input is for changing the location or size of the content object.

10. The display apparatus of claim 9, wherein the interface unit is at least one of, an image recognition device including a camera, a tilt recognition device including a tilt sensor, a keypad, and a mouse pad.

11. The display apparatus of claim 8, wherein the interface unit is a touch panel, and the user's input is a touch input, a multi-touch input, a drag input, a flicking gesture input, a pinch gesture input, or a spread gesture input.

12. The display apparatus of claim 8, wherein the dimming control circuit comprises a dimming value memory configured to store a dimming table for matching the velocity with a value of the brightness.

13. The display apparatus of claim 8, wherein the dimming control circuit adjusts the brightness of light when the velocity of the content object exceeds a threshold value.

14. The display apparatus of claim 8, wherein the dimming control circuit configured to dim a display area including the content object area according to the velocity of the content object, by adjusting brightness of light radiated to the display area in inverse proportion to the velocity of the content object.

15. A dimming method of a display apparatus, comprising:
    displaying a content object on a displaying panel;
    receiving a user's input by an interface unit; and
    dimming a content object area at which the content object is displayed on the display panel according to a velocity of the content object moving by the user's input, by adjusting brightness of the content object area in inverse proportion of the velocity of the content object, wherein the velocity of the content object changes by the user's input on the interface unit.

16. The dimming method of claim 15, wherein the user's input is for changing the location or size of the content object.

17. The dimming method of claim 15, wherein the interface unit is a touch panel and the user's input is at least one of a touch input, a multi-touch input, a drag input, a flicking gesture input, a pinch gesture input, and a spread gesture input, which is input to the touch panel.

18. The dimming method of claim 15, wherein the interface unit is at least one of an image recognition device including a camera, a tilt recognition device including a tilt sensor, an angular velocity recognition device including a gyro sensor, an acceleration recognition device including an acceleration sensor, a motion recognition device including a magnetic sensor, a keypad, and a mouse pad.

19. The dimming method of claim 15, wherein the dimming further comprises returning the value of the brightness to a value before the brightness was adjusted.

20. The dimming method of claim 15, wherein the dimming comprises adjusting the value of the brightness when the velocity of the content object exceeds a threshold value.

21. The dimming method of claim 15, wherein the dimming further comprises, if the velocity of the content object is maintained lower than the threshold value for a reference time period after the value of the brightness is adjusted, returning the adjusted value of the brightness to a value before the value of the brightness was adjusted.

22. The dimming method of claim 15, wherein the dimming comprises dimming a display area including the content object area, according to the velocity of the content object, by adjusting brightness of the display area in inverse proportion of the velocity of the content object.

23. A display apparatus for radiating light using a light source, comprising:
    an interface unit configured to receive a user's input;
    a screen configured to display a content object;
    a light source unit including a plurality of light sources, and configured to radiate light to the screen to display the content object; and
    a dimming control circuit configured
        to dim a content object area at which the content object is displayed on the screen according to a velocity of the content object moving by the user's input, by adjusting brightness of light radiated from the light source to the content object area on the screen in inverse proportion to the velocity of the content object, wherein the velocity of the content object changes by the user's input on the interface unit.

24. The display apparatus of claim 23, wherein the dimming control circuit configured to dim a display area including the content object area according to the velocity of the content object, by adjusting brightness of the display area in inverse proportion of the velocity of the content object.

25. A dimming method of a display apparatus, comprising:
- at an interface unit, sensing an input signal for changing a velocity of content object displayed on the display apparatus;
- at the display apparatus, calculating the velocity of the content object moving by the user's input; and
- at the display apparatus, dimming a content display area at which the content object is displayed on the display apparatus according to the velocity of the content object moving by the user's input, by adjusting brightness of the content display area in inverse proportion to the velocity of the content object, wherein the velocity of the content object changes by the user's input on the interface unit.

26. The dimming method of claim 25, wherein the input signal is a signal for changing the location or size of the content.

27. The dimming method of claim 25, wherein the input signal is at least one of a touch input, a multi-touch input, a drag input, a flicking gesture input, a pinch gesture input, and a spread gesture input, which is input to the touch panel.

28. The dimming method of claim 25, wherein the interface unit is at least one of a touch panel connected to the display apparatus and transferring an input signal, a camera connected to the display apparatus and transferring an input signal, an operation sensor connected to the display apparatus and transferring an input signal, a microphone connected to the display apparatus and transferring an input signal, a tilt sensor connected to the display apparatus and transferring an input signal, a gyro sensor connected to the display apparatus and transferring an input signal, an acceleration sensor connected to the display apparatus and transferring an input signal, a magnetic sensor connected to the display apparatus and transferring an input signal, a keypad connected to the display apparatus and transferring an input signal, and a mouse pad connected to the display apparatus and transferring an input signal.

29. The dimming method of claim 25, wherein the dimming comprises dimming a display area including the content object area, according to the velocity of the content object, by adjusting brightness of the display area in inverse proportion of the velocity of the content object.

* * * * *